US010759248B2

(12) United States Patent
Furuta

(10) Patent No.: US 10,759,248 B2
(45) Date of Patent: Sep. 1, 2020

(54) TRAVELING CONTROL SYSTEM FOR VEHICLE

(71) Applicant: TOYOTA JIDOSHA KABUSHIKI KAISHA, Toyota-shi, Aichi-ken (JP)

(72) Inventor: Hiroki Furuta, Toki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 140 days.

(21) Appl. No.: 16/003,265

(22) Filed: Jun. 8, 2018

(65) Prior Publication Data

US 2019/0001781 A1    Jan. 3, 2019

(30) Foreign Application Priority Data

Jun. 29, 2017   (JP) ................................ 2017-127195

(51) Int. Cl.
*B60G 17/019*   (2006.01)
*B60G 17/06*    (2006.01)

(52) U.S. Cl.
CPC ....... *B60G 17/01908* (2013.01); *B60G 17/06* (2013.01); *B60G 2400/102* (2013.01); *B60G 2400/104* (2013.01); *B60G 2400/106* (2013.01); *B60G 2500/10* (2013.01)

(58) Field of Classification Search
CPC .................................................. B60G 17/018
See application file for complete search history.

(56) References Cited

U.S. PATENT DOCUMENTS

| 7,660,654 | B2* | 2/2010 | Lu ....................... B60T 8/17554 |
| | | | 280/5.506 |
| 8,489,279 | B2* | 7/2013 | Hidaka .............. B60G 17/0165 |
| | | | 701/10 |
| 9,073,398 | B2* | 7/2015 | Kikuchi ............. B60G 17/0165 |
| 9,114,683 | B2* | 8/2015 | Kikuchi .............. B60G 17/015 |
| 9,321,321 | B2* | 4/2016 | Koumura ........... B60G 17/0161 |
| 9,399,470 | B2* | 7/2016 | Koumura ............... B60W 40/11 |
| 9,415,659 | B2* | 8/2016 | Kikuchi ............... B60G 17/018 |
| 10,239,519 | B2* | 3/2019 | Koumura ............. B60W 30/02 |
| 2015/0290995 | A1* | 10/2015 | Kanda ................ B60G 17/0161 |
| | | | 701/37 |
| 2019/0255903 | A1* | 8/2019 | Hirao .................... B60G 17/018 |
| 2019/0283520 | A1* | 9/2019 | Furuta .................... B60G 17/06 |

FOREIGN PATENT DOCUMENTS

| JP | 2011016382 A | * 1/2011 |
| JP | 2016-002778 A | 1/2016 |
| JP | 2016-002844 A | 1/2016 |

* cited by examiner

*Primary Examiner* — Nicole T Verley
(74) *Attorney, Agent, or Firm* — Sughrue Mion, PLLC

(57) ABSTRACT

A traveling control system for a vehicle includes a first sprung structure acceleration sensor, a second sprung structure acceleration sensor, a third sprung structure acceleration sensor, a fourth sprung structure acceleration sensor, and an electronic control unit. The electronic control unit is configured to calculate a vertical acceleration, a roll acceleration, and a pitch acceleration at a gravity center position, calculate vertical accelerations of a sprung structure at positions of a front right wheel, a front left wheel, a rear right wheel, and a rear left wheel, and control traveling of the vehicle based on the vertical accelerations of the sprung structure at the positions of the front right wheel, the front left wheel, the rear right wheel, and the rear left wheel.

4 Claims, 8 Drawing Sheets

TRAVELING CONTROL SYSTEM FOR VEHICLE

INCORPORATION BY REFERENCE

The disclosure of Japanese Patent Application No. 2017-127195 filed on Jun. 29, 2017 including the specification, drawings and abstract is incorporated herein by reference in its entirety.

BACKGROUND

1. Technical Field

The present disclosure relates to a traveling control system for a vehicle that controls traveling of the vehicle. In particular, the present disclosure relates to a traveling control system for a vehicle that controls traveling of the vehicle based on a vertical acceleration of a sprung structure of the vehicle.

2. Description of Related Art

As a suspension system for a vehicle, a shock absorber with variable damping force is used. Typically, control of damping force is performed based on a stroke speed that is a relative speed between a sprung structure of the vehicle (hereinafter, referred to as a "sprung structure") and an unsprung structure of the vehicle.

Japanese Unexamined Patent Application Publication No. 2016-002844 (JP 2016-002844 A) discloses a stroke speed estimation device that estimates a stroke speed. The stroke speed estimation device estimates the stroke speed based on a vertical acceleration of a sprung structure. The vertical acceleration of the sprung structure is detected by a sprung structure acceleration sensor provided in the sprung structure. In estimation processing of the stroke speed, a plant model and an observer configured based on a state space of the equation of motion according to a single-wheel two-degree-of-freedom model are used.

Japanese Unexamined Patent Application Publication No. 2016-002778 (JP 2016-002778 A) discloses a suspension system for a vehicle with variable damping force. The suspension system for a vehicle also includes a sprung structure acceleration sensor that detects a vertical acceleration of a sprung structure at each wheel position, and estimates a stroke speed based on a detection value of the sprung structure acceleration sensor.

SUMMARY

According to the techniques disclosed in JP 2016-002844 A and JP 2016-002778 A, a stroke speed needed for controlling the damping force of the shock absorber is estimated based on the vertical acceleration of the sprung structure. The vertical acceleration of the sprung structure is detected by the sprung structure acceleration sensor provided in the sprung structure. However, in a case where torsional vibration occurs in the sprung structure (body), a component of torsional vibration is superimposed as noise on the detection value of the sprung structure acceleration sensor. Noise described above causes degradation of the estimation accuracy of the stroke speed and degradation of the performance (effect) of damping force control based on the estimated stroke speed.

Control based on the vertical acceleration of the sprung structure is not limited to control of the damping force of the shock absorber. In a further generalized manner, control of traveling of the vehicle based on the vertical acceleration of the sprung structure is considered. In the above-described case, when the component of torsional vibration is superimposed as noise on the detection value of the sprung structure acceleration sensor, the performance (effect) of traveling control for a vehicle is degraded.

The present disclosure provides a traveling control system for a vehicle capable of improving performance of traveling control for a vehicle based on a vertical acceleration of a sprung structure.

An aspect of the present disclosure relates to a traveling control system for a vehicle. The vehicle includes a sprung structure, a front right wheel, a front left wheel, a rear right wheel, and a rear left wheel. The traveling control system includes a first sprung structure acceleration sensor, a second sprung structure acceleration sensor, a third sprung structure acceleration sensor, a fourth sprung structure acceleration sensor, and an electronic control unit. The first sprung structure acceleration sensor is configured to detect a vertical acceleration of the sprung structure at a first position of the sprung structure in a direction of the front right wheel when viewed from a gravity center position of the sprung structure. The second sprung structure acceleration sensor is configured to detect a vertical acceleration of the sprung structure at a second position of the sprung structure in a direction of the front left wheel when viewed from the gravity center position of the sprung structure. The third sprung structure acceleration sensor is configured to detect a vertical acceleration of the sprung structure at a third position of the sprung structure in a direction of the rear right wheel when viewed from the gravity center position of the sprung structure. The fourth sprung structure acceleration sensor is configured to detect a vertical acceleration of the sprung structure at a fourth position of the sprung structure in a direction of the rear left wheel when viewed from the gravity center position of the sprung structure. The electronic control unit is configured to calculate a vertical acceleration, a roll acceleration, and a pitch acceleration at the gravity center position based on the vertical accelerations at the four positions detected by the first sprung structure acceleration sensor, the second sprung structure acceleration sensor, the third sprung structure acceleration sensor, and the fourth sprung structure acceleration sensor, calculate vertical accelerations of the sprung structure at positions of the front right wheel, the front left wheel, the rear right wheel, and the rear left wheel based on the vertical acceleration, the roll acceleration, and the pitch acceleration at the gravity center position under a condition that the sprung structure is a rigid body, and control traveling of the vehicle based on the vertical accelerations of the sprung structure at the positions of the front right wheel, the front left wheel, the rear right wheel, and the rear left wheel.

The traveling control system according to the aspect of the present disclosure may further include four suspensions configured to change damping force. The suspensions may be disposed for the front right wheel, the front left wheel, the rear right wheel, and the rear left wheel, respectively. The electronic control unit may be configured to control the damping force of the suspensions based on the vertical accelerations of the sprung structure at the positions of the front right wheel, the front left wheel, the rear right wheel, and the rear left wheel.

The gravity center position of the sprung structure is close to a "node" of torsion, and is hardly influenced by torsion. In a case where the vertical acceleration, the roll acceleration, and the pitch acceleration at the gravity center position described above are known, the vertical accelerations of the sprung structure may be calculated at the positions of the front right wheel, the front left wheel, the rear right wheel, and the rear left wheel based on the accelerations under the condition that "the sprung structure is a rigid body". In the vertical accelerations obtained by calculation described above, the influence of torsional vibration is excluded. That is, the vertical accelerations with further reduced influence of torsional vibration are obtained.

With the above description, according to the aspect of the present disclosure, the following processing is performed. That is, with the use of the four sprung structure acceleration sensors, the vertical accelerations of the sprung structure at the four positions are detected. The vertical acceleration, the roll acceleration, and the pitch acceleration at the gravity center position of the sprung structure are calculated based on the vertical accelerations at the four positions once. Thereafter, the vertical accelerations at the positions of the front right wheel, the front left wheel, the rear right wheel, and the rear left wheel are calculated based on the vertical acceleration, the roll acceleration, and the pitch acceleration at the gravity center position of the sprung structure under the condition that "the sprung structure is a rigid body". Traveling of the vehicle is controlled based on the vertical accelerations of the sprung structure at the positions of the front right wheel, the front left wheel, the rear right wheel, and the rear left wheel. With the processing described above, the vertical accelerations with further reduced influence of torsional vibration are obtained.

With the use of the vertical accelerations with further reduced influence of torsional vibration, it is possible to effectively execute traveling control for a vehicle. That is, the performance of traveling control for a vehicle based on the vertical acceleration is improved.

According to the aspect of the present disclosure, the damping force of the suspensions is controlled based on the vertical accelerations of the sprung structure at the positions of the front right wheel, the front left wheel, the rear right wheel, and the rear left wheel. With the use of the vertical accelerations with further reduced influence of torsional vibration, it is possible to effectively execute damping force control.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment of the present disclosure will be described referring to the accompanying drawings.

1. Outline

Figure 1:
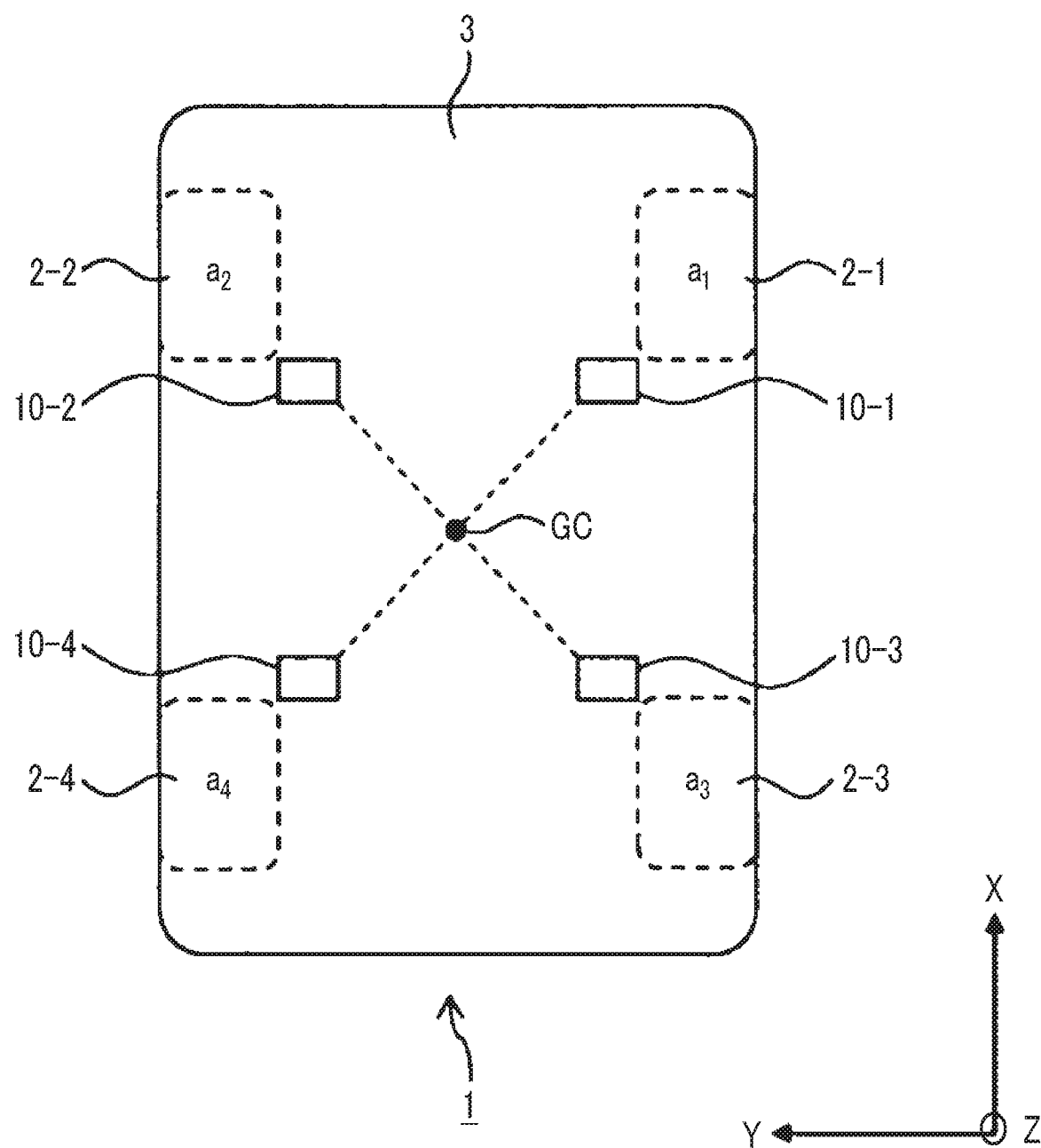
FIG. 1 is a conceptual diagram illustrating the outline of an embodiment of the present disclosure.

FIG. 1 is a conceptual diagram illustrating the outline of the embodiment of the present disclosure. A vehicle 1 includes wheels 2 and a sprung structure 3. The wheels 2 includes a front right wheel 2-1, a front left wheel 2-2, a rear right wheel 2-3, and a rear left wheel 2-4. Vertical accelerations of the sprung structure 3 at positions of the front right wheel 2-1, the front left wheel 2-2, the rear right wheel 2-3, and the rear left wheel 2-4 are represented as $a_1$, $a_2$, $a_3$, and $a_4$.

Control of traveling of the vehicle 1 based on the vertical acceleration $a_i$ at the position of each wheel 2-$i$ (where i=1 to 4) is considered. A simplest method of detecting the vertical acceleration $a_i$ is that a sprung structure acceleration sensor is provided in the sprung structure 3 at the position of each wheel 2-$i$ (for example, see JP 2016-002778 A). However, in a case where torsional vibration occurs in the sprung structure 3 (body), a component of torsional vibration is superimposed as noise on a detection value of the sprung structure acceleration sensor. Noise described above causes degradation of the performance (effect) of traveling control for a vehicle. In order to improve the performance of the traveling control for a vehicle, there is a need to acquire the vertical acceleration $a_i$ with further reduced influence of torsional vibration.

The embodiment provides a technique capable of acquiring the vertical acceleration $a_i$ with further reduced influence of torsional vibration, and then, improving the performance of the traveling control for a vehicle based on the vertical acceleration $a_i$.

A gravity center position GC (hereinafter, referred to as a "sprung gravity center position GC") of the sprung structure 3 is focused. The sprung gravity center position GC is close to a "node" of torsion of the sprung structure 3, and is hardly influenced by torsion. That is, respective mode accelerations (vertical acceleration, roll acceleration, and pitch acceleration) at the sprung gravity center position GC are hardly influenced by torsional vibration. Accordingly, in a case where the vertical acceleration, the roll acceleration, and the pitch acceleration at the sprung gravity center position GC are understood, the vertical acceleration $a_i$ of the sprung structure at the position of each wheel 2-$i$ may be calculated based on the above-described accelerations under a condition that "the sprung structure 3 (body) is a rigid body". From the vertical acceleration $a_i$ obtained by calculation described above, the influence of torsional vibration is excluded. That is, the vertical acceleration $a_i$ with further reduced influence of torsional vibration is obtained.

Calculation of the mode accelerations (vertical acceleration, roll acceleration, and pitch acceleration) at the sprung gravity center position GC is considered. According to the embodiment, in order to calculate the mode acceleration at the sprung gravity center position GC, vertical accelerations of the sprung structure 3 at four positions are used. The four positions are a first position of the sprung structure in a direction of the front right wheel 2-1 when viewed from the when viewed from the sprung gravity center position GC, a second position of the sprung structure in a direction of the front left wheel 2-2 when viewed from the sprung gravity center position GC, a third position of the sprung structure in a direction of the rear right wheel 2-3 when viewed from the sprung gravity center position GC, and a fourth position of the sprung structure in a direction of the rear left wheel 2-4 when viewed from the sprung gravity center position GC. The distance between the sprung gravity center position GC and each of the first to fourth positions is a predetermined distance.

In order to detect the vertical acceleration of the sprung structure 3 at each position, a sprung structure acceleration sensor 10 is used. That is, as shown in FIG. 1, first to fourth sprung structure acceleration sensors 10-1 to 10-4 are provided at four positions of the sprung structure 3. The first sprung structure acceleration sensor 10-1 detects the vertical acceleration of the sprung structure 3 at the first position of the sprung structure in the direction of the front right wheel 2-1 when viewed from the sprung gravity center position GC. The second sprung structure acceleration sensor 10-2 detects the vertical acceleration of the sprung structure 3 at the second position of the sprung structure in the direction of the front left wheel 2-2 when viewed from the sprung gravity center position GC. The third sprung structure acceleration sensor 10-3 detects the vertical acceleration of the sprung structure 3 at the third position of the sprung structure in the direction of the rear right wheel 2-3 when viewed from the sprung gravity center position GC. The fourth sprung structure acceleration sensor 10-4 detects the vertical acceleration of the sprung structure 3 at the fourth position of the sprung structure in the direction of the rear left wheel 2-4 when viewed from the sprung gravity center position GC.

A detection value of the vertical acceleration detected by an i-th sprung structure acceleration sensor 10-$i$ (where i=1 to 4) is hereinafter referred to as a "detection acceleration $Z_i$". The detection acceleration $Z_i$ is influenced by torsional vibration; however, with the use of the detection accelerations $Z_i$ at the four positions, the influence of torsional vibration can be canceled, and the vertical acceleration, the roll acceleration, and the pitch acceleration at the sprung gravity center position GC can be calculated with high accuracy.

In the detection accelerations $Z_i$ at three places, the influence of torsional vibration cannot be canceled successfully. This is because solely one plane is defined by three points, and solely "movement of a plane" can be ascertained from movement of the three points. It is not possible to accurately ascertain "motion of torsion" solely with movement of the three points.

As described above, according to the embodiment, with the use of the first to fourth sprung structure acceleration sensors 10-$i$ (where i=1 to 4), the vertical accelerations of the sprung structure 3 at the four positions are detected as the detection accelerations $Z_i$. The detection accelerations $Z_i$ at the four positions are converted to the vertical acceleration, the roll acceleration, and the pitch acceleration at the sprung gravity center position GC. Thereafter, under a condition that "the sprung structure 3 is a rigid body", the vertical acceleration, the roll acceleration, and the pitch acceleration at the sprung gravity center position GC are converted to the vertical acceleration $a_i$ at the position of each wheel 2-$i$. With the processing described above, the vertical acceleration $a_i$ with further reduced influence of torsional vibration is obtained. With the use of the vertical acceleration $a_i$ with further reduced influence of torsional vibration, it is possible to effectively execute the traveling control for a vehicle. That is, the performance (effect) of the traveling control for a vehicle based on the vertical acceleration $a_i$ is improved.

Hereinafter, a specific example of calculation processing of the vertical acceleration $a_i$ according to the embodiment will be described.

2. Vertical Acceleration Calculation Processing

Figure 2:
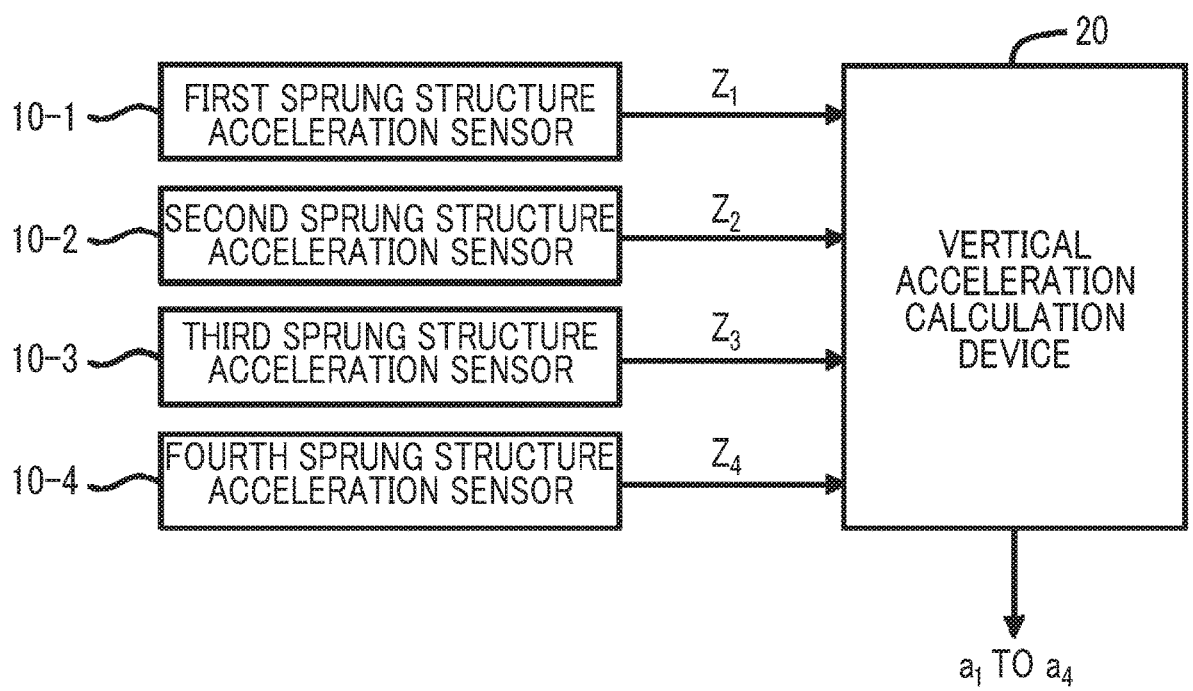
FIG. 2 is a block diagram showing vertical acceleration calculation processing according to the embodiment of the present disclosure.

FIG. 2 is a block diagram showing vertical acceleration calculation processing according to the embodiment. A vertical acceleration calculation device 20 is connected to the first to fourth sprung structure acceleration sensors 10-1 to 10-4, and receives information regarding the detection acceleration $Z_i$ from the i-th sprung structure acceleration sensor 10-$i$ (where i=1 to 4). The vertical acceleration calculation device 20 calculates the vertical acceleration $a_i$ at the position of each wheel 2-$i$ based on the detection acceleration $Z_i$.

The vertical acceleration calculation device 20 is implemented by an electronic control unit (ECU). The ECU is a control device including a processor, a memory, and an input/output interface. The memory stores a control program that the processor is executable. The processor executes the control program, whereby processing of the ECU is implemented.

Figure 3:
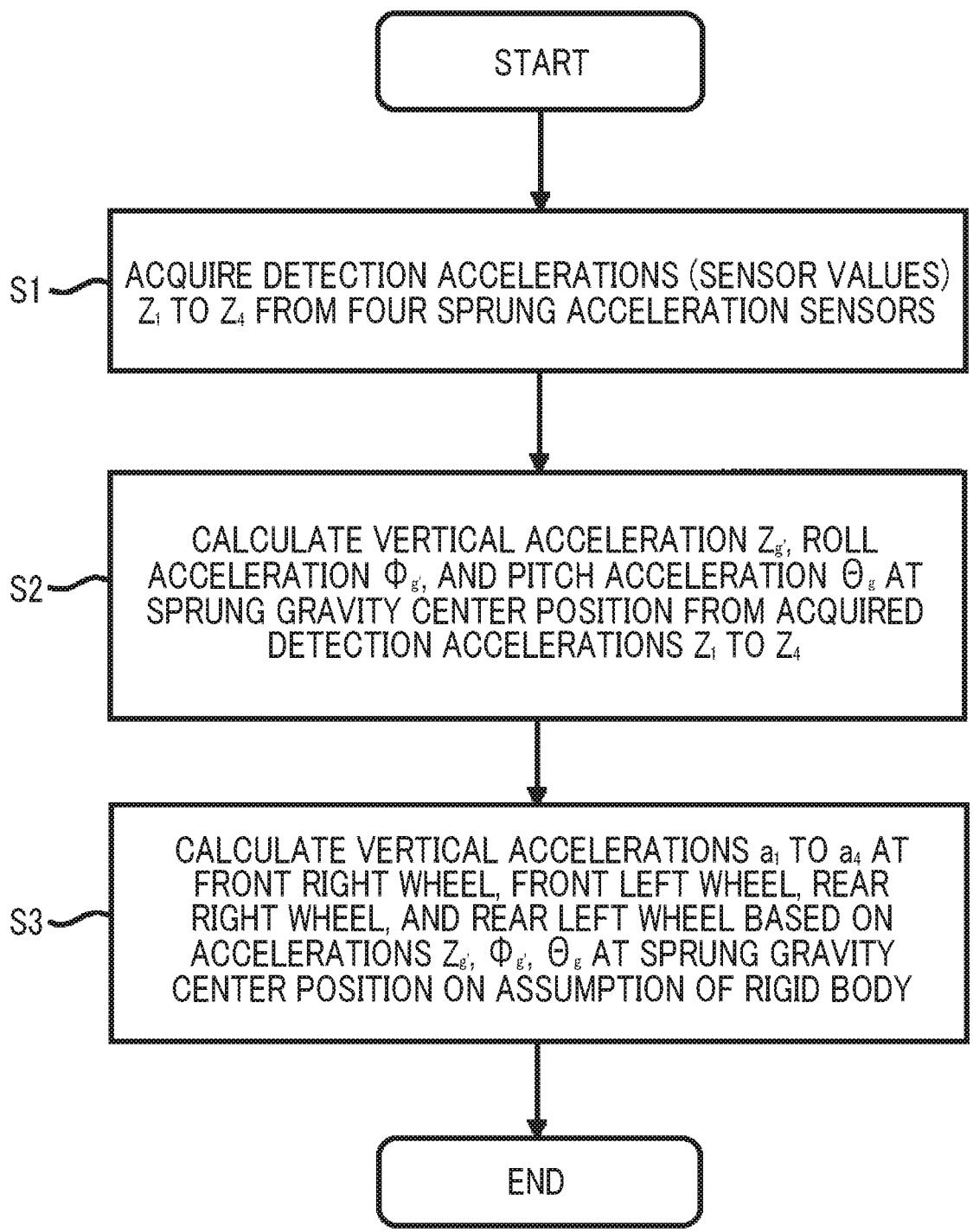
FIG. 3 is a flowchart showing the vertical acceleration calculation processing according to the embodiment of the present disclosure.

FIG. 3 is a flowchart showing the vertical acceleration calculation processing in the vertical acceleration calculation device 20 according to the embodiment.

Step S1 (acquisition of detection acceleration): The first to fourth sprung structure acceleration sensors 10-1 to 10-4 detect the detection accelerations $Z_1$ to $Z_4$ at the respective positions. The vertical acceleration calculation device 20 acquires information regarding the detection acceleration $Z_1$ to $Z_4$ from the first to fourth sprung structure acceleration sensors 10-1 to 10-4.

Figure 4:
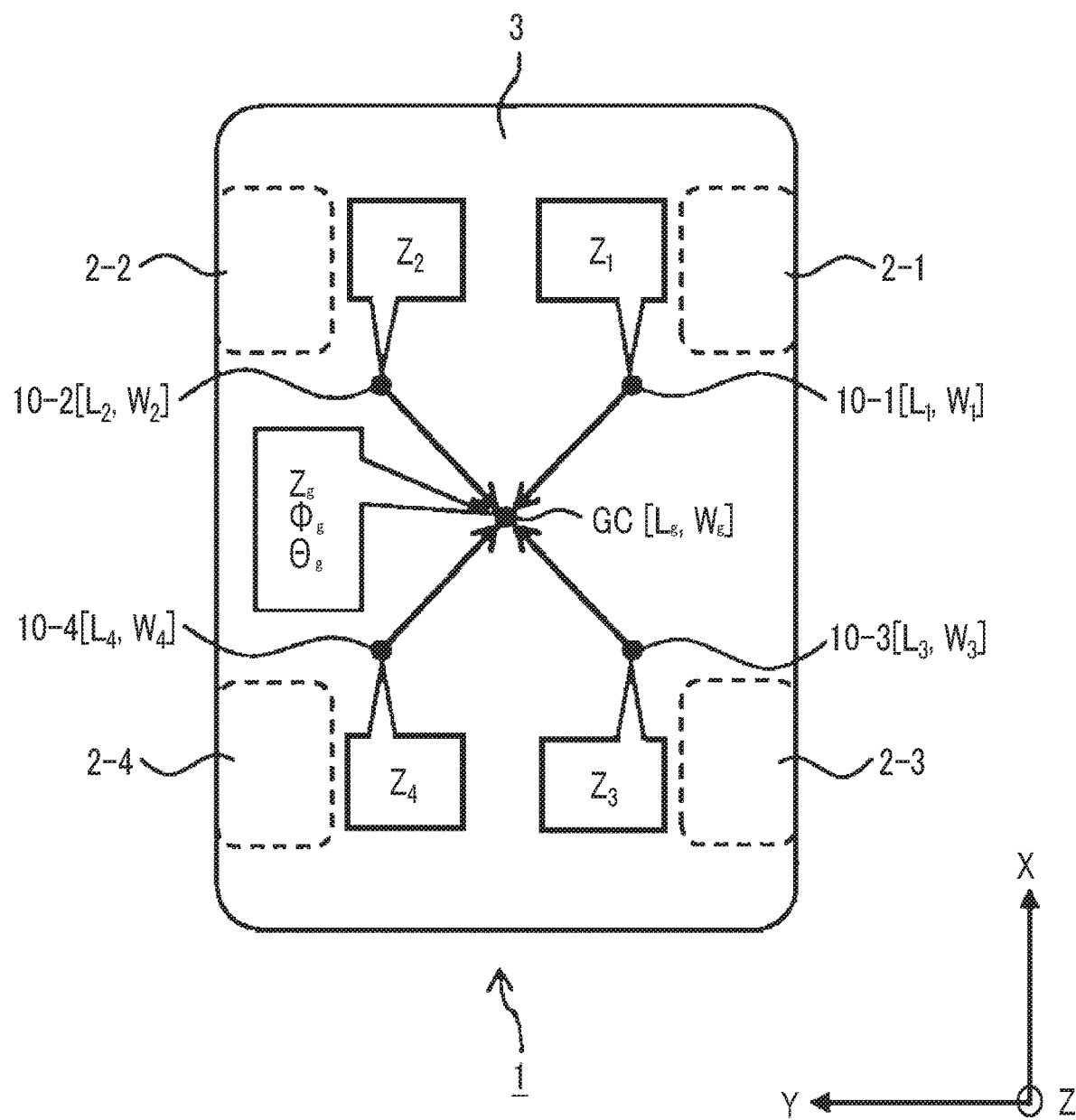
FIG. 4 is a conceptual diagram illustrating Step S2 of the vertical acceleration calculation processing according to the embodiment of the present disclosure.

Step S2 (calculation of mode accelerations at sprung gravity center position): FIG. 4 is a conceptual diagram illustrating Step S2. The X direction is a moving direction of the vehicle 1. The Y direction is a lateral direction of the vehicle 1 and is orthogonal to the X direction. The Z direction is an up-down direction of the vehicle 1 and is orthogonal to the X direction and the Y direction. An X-direction position and a Y-direction position of the i-th sprung structure acceleration sensor 10-$i$ (where i=1 to 4) are represented as $L_i$ and $W_i$, respectively. An X-direction position and a Y-direction position of the sprung gravity center position GC are represented as $L_g$ and $W_g$, respectively. The above-described parameters ($L_i$, $W_i$, $L_g$, $W_g$) are acquired in advance and stored in the memory of the vertical acceleration calculation device 20.

AS the sprung gravity center position GC, a nodal point position with no torsion in the sprung structure 3 may be used. The nodal point position described above can be obtained in advance through an experiment or a simulation.

The vertical acceleration calculation device 20 calculates a vertical acceleration $Z_g$, a roll acceleration $\Phi_g$, and a pitch acceleration $\Theta_g$ at the sprung gravity center position GC from the detection accelerations $Z_1$ to $Z_4$ at the four positions. For example, the vertical acceleration calculation device 20 calculates the vertical acceleration $Z_g$, the roll acceleration $\Phi_g$, and the pitch acceleration $\Theta_g$ according to Expressions (1) to (4).

$$M = \begin{bmatrix} L_1 W_1 & L_1 & W_1 & 1 \\ L_2 W_2 & L_2 & W_2 & 1 \\ L_3 W_3 & L_3 & W_3 & 1 \\ L_4 W_4 & L_4 & W_4 & 1 \end{bmatrix}^{-1} \quad (1)$$

$$Z_g = \sum_{i=1}^{4} \{M(2,i)L_g + M(4,i)\}Z_i \quad (2)$$

$$\Phi_g = -\sum_{i=1}^{4} \{M(1,i)L_g + M(3,i)\}Z_i \quad (3)$$

$$\Theta_g = \sum_{i=1}^{4} M(2,i)Z_i \quad (4)$$

With the use of the detection accelerations $Z_i$ at the four positions, the influence of torsional vibration can be canceled, and the vertical acceleration $Z_g$, the roll acceleration $\Phi_g$, and the pitch acceleration $\Theta_g$ at the sprung gravity center position GC can be calculated with high accuracy.

Figure 5:
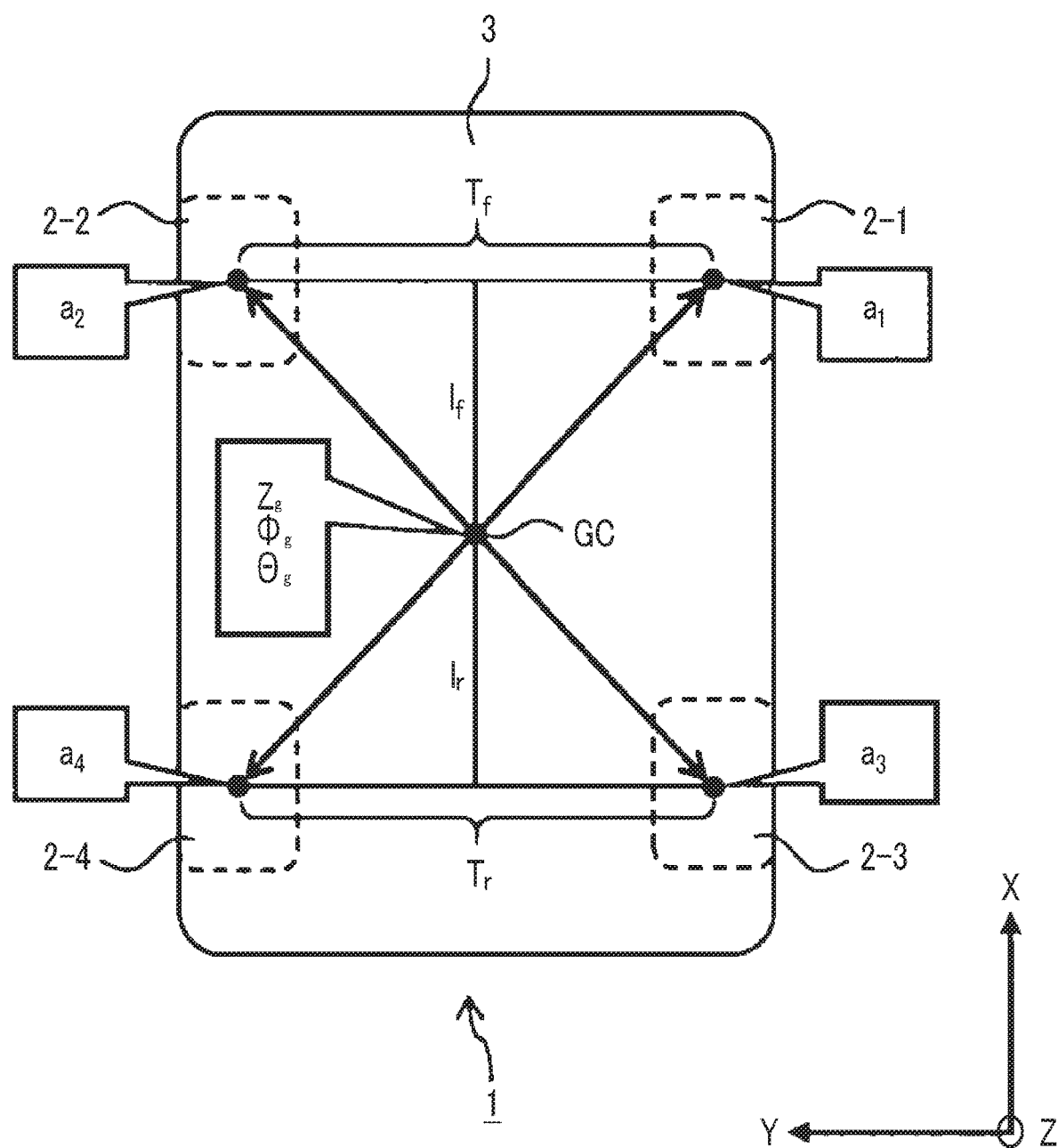
FIG. 5 is a conceptual diagram illustrating Step S3 of the vertical acceleration calculation processing according to the embodiment of the present disclosure.

Step S3 (Calculation of vertical accelerations of sprung structure at four positions of front right wheel, front left wheel, rear right wheel, and rear left wheel): FIG. 5 is a conceptual diagram illustrating Step S3. A tread width of the front wheels (2-1, 2-2) is represented as $T_f$, and a tread width of the rear wheels (2-3, 2-4) is represented as $T_r$. The distance between a front wheel shaft and the sprung gravity center position GC is represented as $l_f$, and the distance between a rear wheel shaft and the sprung gravity center position GC is represented as $l_r$.

The vertical acceleration calculation device 20 calculates vertical accelerations $a_1$ to $a_4$ of the sprung structure at the positions of the front right wheel, the front left wheel, the rear right wheel, and the rear left wheel based on the vertical acceleration $Z_g$, the roll acceleration $\Phi_g$, and the pitch acceleration $\Theta_g$ at the sprung gravity center position GC under a condition that the sprung structure 3 is a rigid body. For example, the vertical acceleration calculation device 20 calculates the vertical accelerations $a_1$ to $a_4$ based on the vertical acceleration $Z_g$, the roll acceleration $\Phi_g$, and the pitch acceleration $\Theta_g$ at the sprung gravity center position GC according to Expression (5).

$$\begin{bmatrix} a_1 \\ a_2 \\ a_3 \\ a_4 \end{bmatrix} = \begin{bmatrix} 1 & -\frac{T_f}{2} & -l_f \\ 1 & \frac{T_f}{2} & -l_f \\ 1 & -\frac{T_r}{2} & l_r \\ 1 & \frac{T_r}{2} & l_r \end{bmatrix} \begin{bmatrix} Z_g \\ \Phi_g \\ \Theta_g \end{bmatrix} \quad (5)$$

In the above-described manner, the vertical acceleration calculation device 20 can calculate the vertical accelerations $a_1$ to $a_4$ with further reduced influence of torsional vibration. The calculated vertical accelerations $a_1$ to $a_4$ are used in traveling control for a vehicle. Hereinafter, a traveling control system for a vehicle according to the embodiment will be described.

3. Traveling Control System for Vehicle

Figure 6:
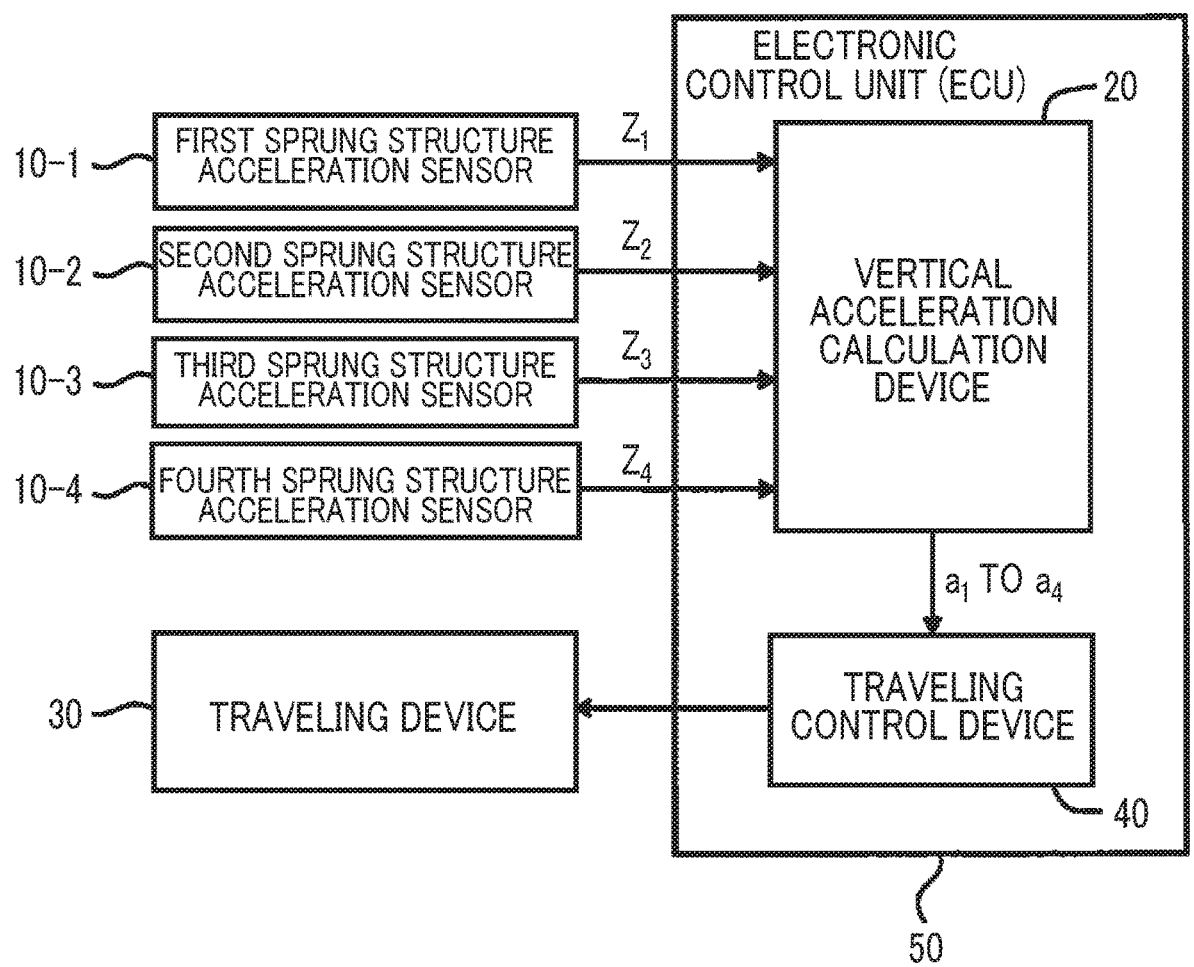
FIG. 6 is a block diagram showing the configuration of a traveling control system for a vehicle according to the embodiment of the present disclosure.

FIG. 6 is a block diagram showing the configuration of the traveling control system 100 for a vehicle according to the embodiment. The traveling control system 100 for a vehicle is mounted in the vehicle 1 and controls traveling of the vehicle 1. In more detail, the traveling control system 100 for a vehicle includes a traveling device 30 and a traveling control device 40 in addition to the first to fourth sprung structure acceleration sensors 10-1 to 10-4 and the vertical acceleration calculation device 20 described above.

The traveling device 30 is a device related to traveling of the vehicle 1, and includes a suspension, a drive device, a braking device, a steering device, a transmission, and the like.

The traveling control device 40 performs control of the traveling device 30, thereby controlling traveling of the vehicle 1. In particular, the traveling control device 40 according to the embodiment controls traveling of the vehicle 1 based on the vertical accelerations $a_1$ to $a_4$ calculated by the vertical acceleration calculation device 20. As described above, in the vertical accelerations $a_1$ to $a_4$ calculated by the vertical acceleration calculation device 20, the influence of torsional vibration is further reduced. With the use of the vertical accelerations $a_1$ to $a_4$ described above, it is possible to effectively execute the traveling control for a vehicle. That is, the performance (effect) of the traveling control for a vehicle based on the vertical acceleration $a_i$ is improved.

Both of the vertical acceleration calculation device 20 and the traveling control device 40 are implemented by an electronic control unit (ECU) 50. That is, the ECU 50 functions not only as the vertical acceleration calculation device 20 but also as the traveling control device 40.

3-1. Control of Damping Force of Suspension

As an example of traveling control for a vehicle according to the embodiment, control of damping force of a suspension is considered. The damping force of a suspension is finely controlled according to a traveling state of the vehicle 1, thereby further stabilizing the posture of the vehicle 1 and implementing pleasant riding comfort and handling stability.

Figure 7:
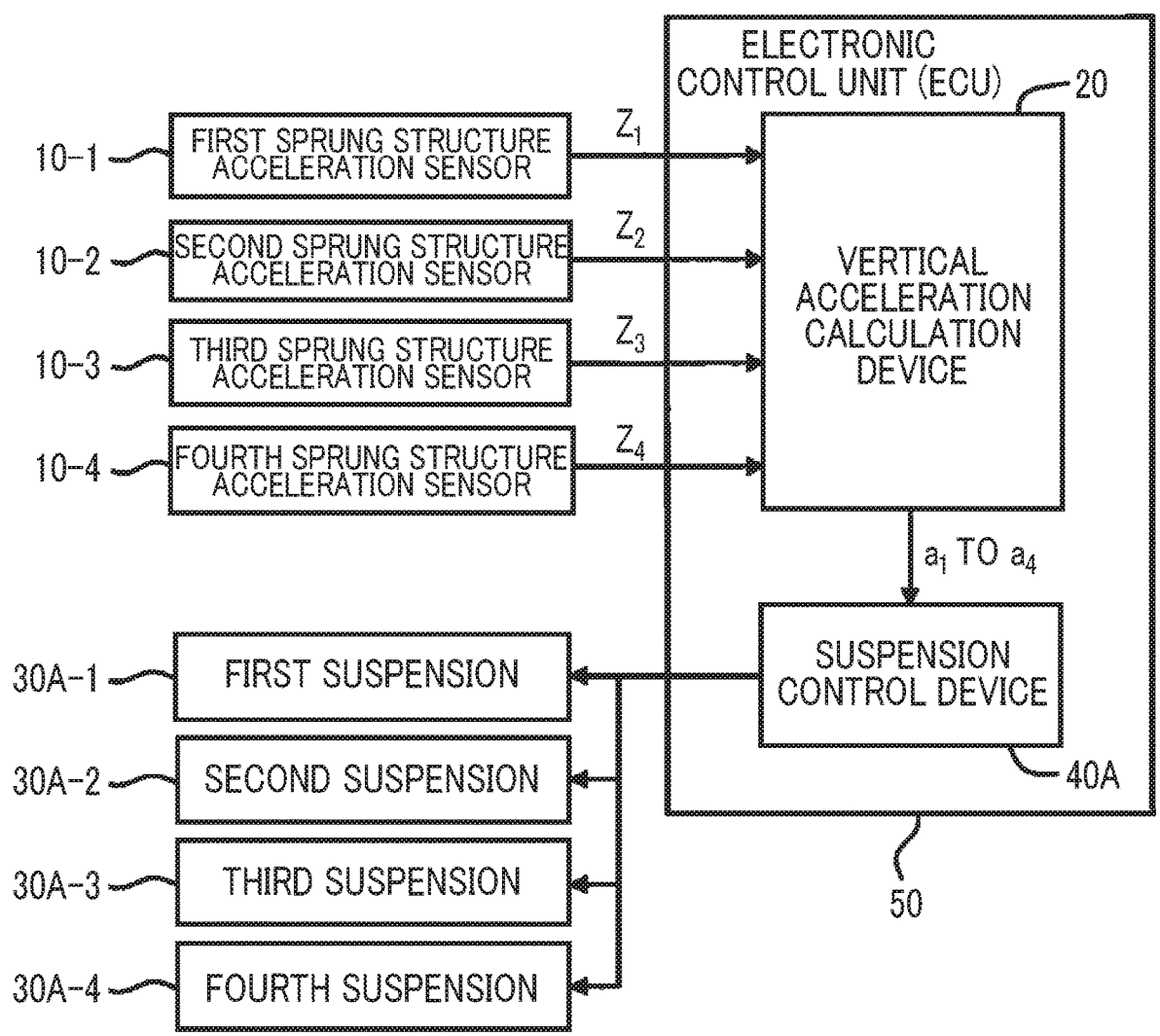
FIG. 7 is a block diagram showing an example of the traveling control system for a vehicle according to the embodiment of the present disclosure.

FIG. 7 is a block diagram showing a configuration example of a traveling control system 100A for a vehicle that controls damping force of a suspension. In the configuration example, the traveling device 30 includes a first suspension 30A-1, a second suspension 30A-2, a third suspension 30A-3, and a fourth suspension 30A-4. The traveling control device 40 includes a suspension control device 40A.

The first suspension 30A-1 is provided for the front right wheel 2-1. The second suspension 30A-2 is provided for the front left wheel 2-2. The third suspension 30A-3 is provided for the rear right wheel 2-3. The fourth suspension 30A-4 is provided for the rear left wheel 2-4. In each suspension 30A-i (where i=1 to 4), the sprung structure 3 and an unsprung structure (not shown) are connected through a shock absorber. The damping force of the shock absorber is variable.

The suspension control device 40A controls the damping force of each suspension 30A-i based on the vertical acceleration $a_i$ of the sprung structure 3 at the position of each wheel 2-i (where i=1 to 4). As a method of controlling the damping force of each suspension 30A-i based on the vertical acceleration $a_i$ of the sprung structure 3, various methods are known (for example, see JP 2016-002844 A and JP 2016-002778 A). In the embodiment, a control method of damping force is not particularly limited.

For example, the suspension control device 40A estimates a stroke speed at an i-th suspension 30A-i based on the vertical acceleration $a_i$. The stroke speed is a relative speed between the sprung structure 3 and the unsprung structure. For example, as described in JP 2016-002844 A, the stroke speed can be estimated from the vertical acceleration $a_i$ of the sprung structure 3. The suspension control device 40A controls the damping force of the i-th suspension 30A-i based on the estimated stroke speed.

According to the embodiment, the vertical acceleration $a_i$ with further reduced influence of torsional vibration is calculated by the vertical acceleration calculation device 20.

With the use of the vertical acceleration $a_i$ described above, the estimation accuracy of the stroke speed is improved. As a result, the performance (effect) of damping force control based on the estimated stroke speed is improved.

3-2. Control of Drive Power

As another example of traveling control for a vehicle, control of drive power is considered. The drive power of each wheel 2-*i* of the vehicle 1 is controlled independently, thereby generating desired moment and stabilizing the posture of the vehicle 1.

Figure 8:
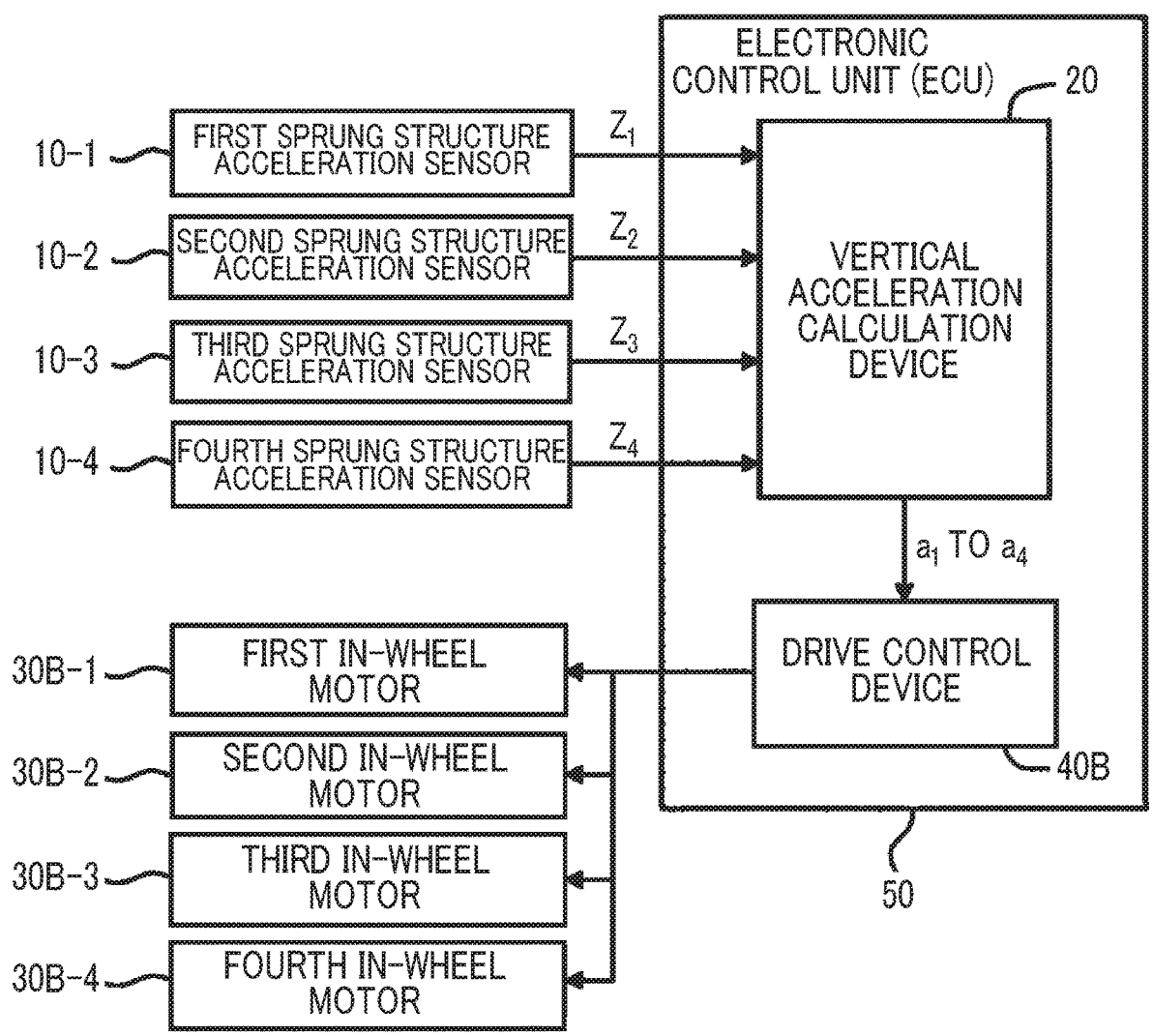
FIG. 8 is a block diagram showing another example of the traveling control system for a vehicle according to the embodiment of the present disclosure.

FIG. 8 is a block diagram showing a configuration example of a traveling control system 100B for a vehicle that controls drive power. In the configuration example, the traveling device 30 includes a first in-wheel motor 30B-1, a second in-wheel motor 30B-2, a third in-wheel motor 30B-3, and a fourth in-wheel motor 30B-4. The traveling control device 40 includes a drive control device 40B.

The first in-wheel motor 30B-1 is provided for the front right wheel 2-1. The second in-wheel motor 30B-2 is provided for the front left wheel 2-2. The third in-wheel motor 30B-3 is provided for the rear right wheel 2-3. The fourth in-wheel motor 30B-4 is provided for the rear left wheel 2-4. Each in-wheel motor 30B-i (where i=1 to 4) generates drive power.

The drive control device 40B controls the drive power of the in-wheel motor 30B-i (where i=1 to 4) independently. For example, the drive control device 40B controls drive power based on the vertical accelerations $a_1$ to $a_4$ of the sprung structure 3 such that vibration of the sprung structure 3 is suppressed.

According to the embodiment, the vertical acceleration $a_i$ with further reduced influence of torsional vibration is calculated by the vertical acceleration calculation device 20. With the use of the vertical acceleration $a_i$ described above, the performance (effect) of drive power control is improved.

What is claimed is:

1. A traveling control system for a vehicle including a sprung structure, a front right wheel, a front left wheel, a rear right wheel, and a rear left wheel, the traveling control system comprising:
    a first sprung structure acceleration sensor configured to detect a vertical acceleration of the sprung structure at a first position of the sprung structure in a direction of the front right wheel when viewed from a gravity center position of the sprung structure;
    a second sprung structure acceleration sensor configured to detect a vertical acceleration of the sprung structure at a second position of the sprung structure in a direction of the front left wheel when viewed from the gravity center position of the sprung structure;
    a third sprung structure acceleration sensor configured to detect a vertical acceleration of the sprung structure at a third position of the sprung structure in a direction of the rear right wheel when viewed from the gravity center position of the sprung structure;
    a fourth sprung structure acceleration sensor configured to detect a vertical acceleration of the sprung structure at a fourth position of the sprung structure in a direction of the rear left wheel when viewed from the gravity center position of the sprung structure; and
    an electronic control unit configured to
        calculate a vertical acceleration, a roll acceleration, and a pitch acceleration at the gravity center position based on the vertical accelerations at the four positions detected by the first sprung structure acceleration sensor, the second sprung structure acceleration sensor, the third sprung structure acceleration sensor, and the fourth sprung structure acceleration sensor,
        calculate vertical accelerations of the sprung structure at positions of the front right wheel, the front left wheel, the rear right wheel, and the rear left wheel based on the vertical acceleration, the roll acceleration, and the pitch acceleration at the gravity center position under a condition that the sprung structure is a rigid body, and
        control traveling of the vehicle based on the vertical accelerations of the sprung structure at the positions of the front right wheel, the front left wheel, the rear right wheel, and the rear left wheel.

2. The traveling control system according to claim 1, further comprising four suspensions configured to change damping force, the suspensions being disposed for the front right wheel, the front left wheel, the rear right wheel, and the rear left wheel, respectively,
    wherein the electronic control unit is configured to control the damping force of the suspensions based on the vertical accelerations of the sprung structure at the positions of the front right wheel, the front left wheel, the rear right wheel, and the rear left wheel.

3. The traveling control system according to claim 1, wherein each of the first sprung structure acceleration sensor, the second sprung structure acceleration sensor, the third sprung structure acceleration sensor, and the fourth sprung structure acceleration sensor are configured to output a respective vertical acceleration value to the electronic control unit.

4. The traveling control system according to claim 3, wherein the electronic control unit is configured to calculate the vertical acceleration, the roll acceleration, and the pitch acceleration at the gravity center position based on the respective vertical acceleration value outputted from each of the first sprung structure acceleration sensor, the second sprung structure acceleration sensor, the third sprung structure acceleration sensor, and the fourth sprung structure acceleration sensor.

* * * * *